United States Patent
Andoh

(10) Patent No.: US 10,260,786 B2
(45) Date of Patent: Apr. 16, 2019

(54) ELECTROMAGNETIC VALVE

(71) Applicant: TGK CO., LTD., Tokyo (JP)

(72) Inventor: Toshihiro Andoh, Tokyo (JP)

(73) Assignee: TGK CO., LTD., Tokyo (JP)

( * ) Notice: Subject to any disclaimer, the term of this patent is extended or adjusted under 35 U.S.C. 154(b) by 252 days.

(21) Appl. No.: 14/876,768

(22) Filed: Oct. 6, 2015

(65) Prior Publication Data
US 2016/0131403 A1   May 12, 2016

(30) Foreign Application Priority Data

Nov. 6, 2014   (JP) ................. 2014-225830

(51) Int. Cl.
| | |
|---|---|
| F25B 41/04 | (2006.01) |
| F25B 41/06 | (2006.01) |
| F25B 43/00 | (2006.01) |
| F16K 27/02 | (2006.01) |
| F16K 31/06 | (2006.01) |

(52) U.S. Cl.
CPC .......... *F25B 41/046* (2013.01); *F16K 27/029* (2013.01); *F16K 31/0655* (2013.01); *F25B 41/062* (2013.01); *F25B 43/003* (2013.01); *F25B 2341/062* (2013.01); *F25B 2341/0653* (2013.01); *F25B 2341/0671* (2013.01); *Y02B 30/72* (2013.01)

(58) Field of Classification Search
CPC .. F16K 27/029; F16K 31/0655; F25B 41/046; F25B 43/003; F25B 2341/0671; F25B 2341/0653
See application file for complete search history.

(56) References Cited

U.S. PATENT DOCUMENTS

2011/0284646 A1\* 11/2011 Furlong ................ F16K 31/002
236/93 R

FOREIGN PATENT DOCUMENTS

| EP | 2 623 827 A1 | 8/2013 | ............ F16K 31/42 |
|---|---|---|---|
| JP | 2003-156268 | 5/2003 | ............ F25B 41/06 |
| JP | 2011196427 A | * 10/2011 | |
| JP | 2011225039 A | * 11/2011 | |
| JP | 2011235722 A | * 11/2011 | |

(Continued)

OTHER PUBLICATIONS

Hisatoshi, Control Valve and Air Conditioning and Heating Device for Vehicle, Oct. 6, 2011, JP2011196427A, Whole Document.*

(Continued)

*Primary Examiner* — Larry L Furdge
(74) *Attorney, Agent, or Firm* — Penilla IP, APC

(57) ABSTRACT

An electromagnetic valve according to one embodiment includes a body having a lead-in port through which a refrigerant is led in, a lead-out port through which the refrigerant is led out, and a valve hole formed in a passage joining the lead-in port to the lead-out port, a main valve element that opens and closes a valve section by moving toward and away from the valve hole, and a solenoid that supplies a drive force in a direction of axis line to the valve element, the solenoid being mounted on the body. The main valve element has a pilot passage that is open to the valve hole and an orifice that throttles and expands the refrigerant led in from the lead-in port so as to be led out to the pilot passage, the orifice being so formed as to communicate between the lead-in port and the pilot passage.

4 Claims, 4 Drawing Sheets

(56) References Cited

FOREIGN PATENT DOCUMENTS

| JP | 2014-152848 | 8/2014 | ............. | F16K 31/06 |
| JP | 2014-152848 A | 8/2014 | ............. | F16K 31/06 |
| WO | WO 2014/054218 A1 | 4/2014 | ............. | F25B 41/06 |

OTHER PUBLICATIONS

Hirota, Control Valve and Vehicle Air Conditioner, Nov. 10, 2011, JP2011225039A, Whole Document.*
Hirota, Control Valve and Air Conditioner for Vehicle, Nov. 24, 2011, JP2011235722A, Whole Document.*
EP15191041, European Search Report, dated Mar. 1, 2016, Munich.

* cited by examiner

ELECTROMAGNETIC VALVE

CLAIM OF PRIORITY

This application claims priority to Japanese Patent Application No. 2014-225830, filed Nov. 6, 2014, and is incorporated herein by reference.

BACKGROUND OF THE INVENTION

1. Field of the Invention

The present invention relates to an electromagnetic valve and, more particularly to an electromagnetic valve capable of functioning as an expander.

2. Description of the Related Art

In recent years, an air conditioner of heat pump type is proposed as an automotive air conditioner. In this air conditioner, a cycle operation using a refrigerant is carried out not only for the cooling but also for the heating, and a vehicle's passenger compartment can be dehumidified and heated. Such an automotive air conditioner has a refrigeration cycle including a compressor, an external heat exchanger, an evaporator, an internal heat exchanger and so forth. The functions of the external heat exchanger are switched between when the air conditioner is in a heating operation and when it is in a cooling operation. At the time the air conditioner is in the heating operation, the external heat exchanger functions as an evaporator. At this time, the internal heat exchanger radiates heat in a process where the refrigerant circulates in the refrigeration cycle, and the thus radiated heat heats air inside the passenger compartment. At the time the air conditioner is in a cooling operation, the external heat exchanger functions as a condenser. At this time, the refrigerant condensed by the external heat exchanger is evaporated by the evaporator, and the evaporative latent heat cools the air inside the passenger compartment.

In such an automotive air conditioner as described above, an expander is installed upstream of the evaporator. To facilitate the evaporation of the refrigeration by the evaporator installed downstream of the expander, the expander throttles and expands the refrigerant from an upstream side and delivers it to a downstream side by turning it into a spray. For such an expander as described above, an expansion valve, whose valve opening degree can be varied, an orifice, whose valve opening degree is fixed, and so forth are generally employed. As for the external heat exchanger, however, a relatively large flow rate of refrigerant needs to be ensured when the external heat exchanger functions as the condenser. Accordingly, a configuration is such that an electromagnetic valve is provided in parallel with the expander in a position upstream of the external heat exchanger and such that the flow rate thereof is ensured by opening the electromagnetic valve (see Reference (1) in the following Related Art List, for instance).

RELATED ART LIST (1) Japanese Unexamined Patent Application Publication No. 2014-152848.

In the configuration disclosed in Reference (1), the expander and the electromagnetic valve are respectively connected to separate pipings. This increases the number of piping joints and thereby a problem of external leakage of refrigerant is more likely to occur by as much as the increased number of piping joints. In the light of this, it may be conceivable that the orifice is processed, within the body of the electromagnetic valve, separately from a main passage. However, there are restrictions due to the arrangement of the main passage and the valve mechanism and therefore a problem of production efficiency is more likely to arise where, for example, an extra processing work on the body needs be done in order to process this orifice.

SUMMARY OF THE INVENTION

A purpose of the present invention is to efficiently provide an electromagnet valve capable of functioning as an expander.

One embodiment of the preset invention includes: a body having a lead-in port through which a refrigerant is led in, a lead-out port through which the refrigerant is led out, and a valve hole formed in a passage joining the lead-in port to the lead-out port; a valve element that opens and closes a valve section by moving toward and away from the valve hole; and a solenoid that supplies a drive force in a direction of axis line to the valve element, the solenoid being mounted on the body. The valve element has: a hole portion that is open to the valve hole; and an orifice, having a cross section smaller than that of the hole portion, which throttles and expands the refrigerant led in from the lead-in port so as to be led out to the hole portion, the orifice being so formed as to communicate between the lead-in port and the hole portion.

By employing this embodiment, the hole portion and the orifice in the valve element form constantly a communicating path that communicates between the lead-in port and the lead-out port. The refrigerant led in from the lead-in port is throttled and expanded when it passes through the orifice, and then the refrigerant is led out from the lead-out port. By employing this embodiment, the orifice is formed not in the body but in the valve element and therefore the constraints imposed by the arrangements of the passages inside the body and a valve mechanism are less likely to be binding. Also, since the valve element is smaller than the body, the orifice may be formed in a process different from the forming of the body. This can suppress the amount of processing required by the forming of the orifice and therefore can raise the manufacturing efficiency of the electromagnetic valve.

DETAILED DESCRIPTION OF THE INVENTION

The invention will now be described by reference to the preferred embodiments. This does not intend to limit the scope of the present invention, but to exemplify the invention.

Embodiments of the present invention will now be described in detail with reference to the accompanying drawings. In the following description, for convenience of description, the positional relationship in each structure may be expressed with reference to how each structure is depicted in Figures.

Figure 1:
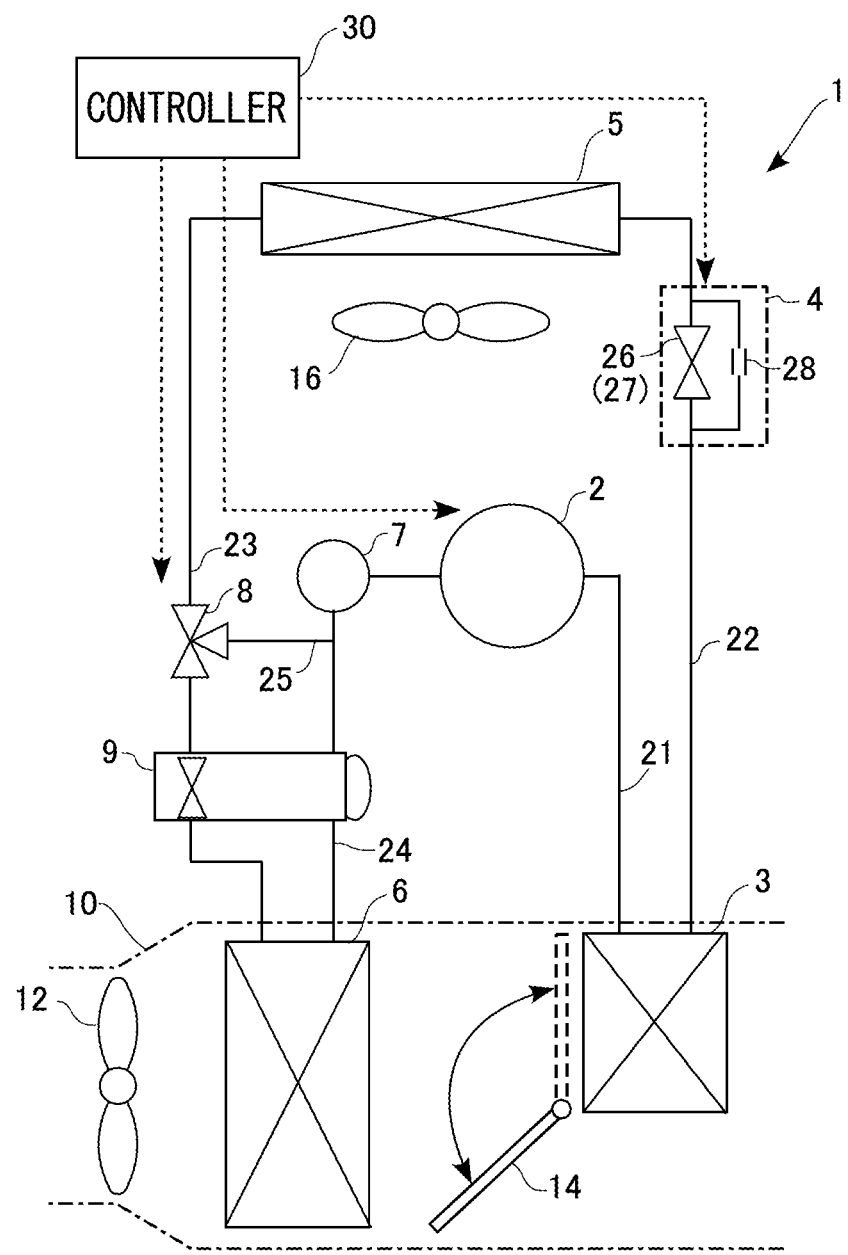
FIG. 1 is a system chart showing an automotive air conditioner to which a control valve according to an embodiment is applied.

FIG. 1 is a system chart showing an automotive air conditioner to which a control valve according to an embodiment is applied. An automotive air conditioner 1 is provided with a refrigeration cycle (refrigerant circulation circuit). In this refrigeration cycle, a compressor 2, an auxiliary condenser 3 (internal heat exchanger), an external heat exchanger 5, an evaporator 6, and an accumulator 7 are connected to each other by piping. The automotive air conditioner 1 is configured as a heat pump type air conditioner. The air conditioner 1 performs air conditioning inside a vehicle's passenger compartment using the heat of refrigerant in a process where the refrigerant circulates within the refrigeration cycle while the refrigerant changes its state. As the refrigerant, HFC-134a (hydrochlorofluorocarbon), HFO-1234yf or the like may be used.

The compressor 2 and the external heat exchanger 5 are provided outside a vehicle's passenger compartment. That is, the compressor 2 and the external heat exchanger 5 are installed in an engine room. On the other hand, a duct 10, in which air is heat-exchanged, is provided inside the passenger compartment. The evaporator 6 is provided upstream of air flow in the duct 10, whereas the auxiliary condenser 3 is provided downstream thereof. The auxiliary condenser 3 is configured as an internal condenser.

The automotive air conditioner 1 is operated such that a plurality of refrigerant circulation passages are switched between the heating operation and the cooling operation. This refrigeration cycle is configured such that the auxiliary condenser 3 and the external heat exchanger 5 are operable in series with each other as a condenser. Also, the refrigeration cycle is configured such that the evaporator 6 and the external heat exchanger 5 are switchable as an evaporator. A first refrigerant circulation passage, where the refrigerant circulates at the time of cooling, and a second refrigerant circulation passage, where the refrigerant circulates at the time of heating, are formed in the refrigeration cycle.

In the first refrigerant circulation passage, the refrigerant circulates in the following order: the compressor 2→the auxiliary condenser 3→the external heat exchanger 5→the evaporator 6→the accumulator 7→the compressor 2. In the second refrigerant circulation passage, the refrigerant circulates in the following order: the compressor 2→the auxiliary condenser 3→the external heat exchanger 5→the accumulator 7→the compressor 2. In other words, the second refrigerant circulation passage is a passage that bypasses the evaporator 6.

More specifically, a discharge chamber of the compressor 2 connects to an inlet of the auxiliary condenser 3 via a first passage 21, and an outlet of the auxiliary condenser 3 connects to an inlet of the external heat exchanger 5 via a second passage 22. An outlet of the external heat exchanger 5 connects to an inlet of the evaporator 6 via a third passage 23, and an outlet of the evaporator 6 connects to an inlet of the accumulator 7 via a fourth passage 24 (return passage). A branch point is provided halfway in the third passage 23, and a bypass passage 25 connecting to the inlet of the accumulator 7 is so provided as to bypass the evaporator 6. The first passage 21, the second passage 22, the third passage 23 and the fourth passage 24 constitute the first refrigerant circulation passage. The first passage 21, the second passage 22, the third passage 23 and the bypass passage 25 constitute the second refrigerant circulation passage.

A control valve 4 capable of functioning as the expander is provided halfway in the second passage 22. A switching valve 8 for switching the flow path of refrigerant is provided at the branch point, in the third passage 23, where the bypass passage 25 is branched out. An expansion valve 9 is provided between the switching valve 8 and the evaporator 6 in the third passage 23.

The control valve 4 is a so-called pilot-operated electromagnetic valve, and includes a main valve 26 that opens and closes a main passage (described later) constituting the second passage 22, a pilot valve 27 that causes the main valve 26 to be open and closed, and an orifice 28 that functions as an expander during a closed state of the main valve 26. The control valve 4 ensures a certain flow rate of refrigerant by opening the main valve 26 during a cooling operation; the control valve 4 has the orifice 28 function as the expander by closing the main valve 26 during a heating operation. In the following description, the opening/closing of the main valve 26 is used for the same meaning as the opening/closing of the control valve 4. A detailed description is given later of the control valve 4.

The switching valve 8 is a three-way valve comprised of a first valve section for opening and closing the third passage 23, a second valve section for opening and closing the bypass passage 25, and an actuator for driving each of these first and second valve sections. Opening and closing the first valve section permits and blocks the flow of refrigerant from the external heat exchanger 5 to the evaporator 6, respectively. Opening and closing the second valve section permits and blocks the flow of refrigerant flowing directly from the external heat exchanger 5 to the accumulator 7, respectively. Specifically, opening the first valve section and closing the second valve section open the first refrigerant circulation passage and block the second refrigerant circulation passage. Closing the first valve section and opening the second valve section block the first refrigerant circulation passage and open the second refrigerant circulation passage. As the actuator of the switching valve 8, a solenoid may be used or a stepping motor or the like may be used.

The expansion valve 9 is provided in the first refrigerant circulation passage. The expansion valve 9 throttles and expands the refrigerant led out from the external heat exchanger 5 (an external condenser) and then supplies this refrigerant to the evaporator 6, during a cooling operation. The expansion valve 9 is a thermostatic expansion valve that senses the temperature and the pressure of refrigerant flowing from the evaporator 6 to the compressor 2 and thereby operates autonomously and that regulates the flow rate of refrigerant flowing from the external heat exchanger 5 to the evaporator 6. The expansion valve 9 has a first internal passage that constitutes part of the third passage 23, a second internal passage that constitutes part of the fourth passage 24, a valve section that is provided in the first internal passage, and a temperature-sensing section that senses the temperature and pressure of refrigerant flowing through the second internal passage.

An internal air blower 12, the evaporator 6 and the auxiliary condenser 3 are provided in this order starting from an upstream side of air flow in the duct 10. An air mix door 14, which is freely rotatably provided upstream of the auxiliary condenser 3, regulates the ratio of the volume of air flow passing through the auxiliary condenser 3 and that of air flow bypassing the auxiliary condenser 3. Also, an external air blower 16 is so arranged as to face the external heat exchanger 5.

The compressor 2 is configured as a motor compressor that houses a motor and a compression mechanism within a housing. The compressor 2, which is driven by the current supplied from a not-shown battery, varies the refrigerant discharging capacity in response to the rotational speed of the motor. Various types of compressors including a reciprocal type, a rotary type and a scroll type may be used as the compressor 2. The motor compressor itself is publicly known and therefore the description thereof is omitted here.

The auxiliary condenser 3, which is provided inside the vehicle's passenger compartment, functions as an internal condenser that radiates heat off the refrigerant separately from the external heat exchanger 5. That is, the heat is radiated when the high-temperature and high-pressure refrigerant discharged from the compressor 2 passes through the auxiliary condenser 3. The air that has been divided in response to the opening degree of the air mix door 14 is heat-exchanged in a process where the air passes through the auxiliary condenser 3.

The external heat exchanger 5, which is installed outside the passenger compartment, functions as an external condenser that radiates heat off the refrigerant passing through the inside during a cooling operation. On the other hand, the external heat exchanger 5 functions as an external evaporator that evaporates the refrigerant passing through the inside during a heating operation. The external air blower 16 is a suction type air blower that introduces outside air by rotating and driving an axial flow fan by a motor. The external heat exchanger 5 performs heat exchange between the outside air and the refrigerant.

The evaporator 6, which is installed inside the passenger compartment, functions as an internal evaporator that evaporates the refrigerant passing through the inside. That is, the low-temperature and low-pressure refrigerant having passed through the expansion valve 9 evaporates as the refrigerant passes through the evaporator 6. The air led from an upstream side of the duct 10 is cooled by the evaporative latent heat. At this time, the cooled and dehumidified air is divided into air that passes through the auxiliary condenser 3 and air that bypasses the auxiliary condenser 3, according to the opening degree of the air mix door 14. The air passing through the auxiliary condenser 3 is heated in this process of passing therethrough. At a downstream side of the auxiliary condenser 3, the air that has passed through the auxiliary condenser 3 and the air that has bypassed the auxiliary condenser 3 are mixed together and regulated to a target temperature, and then supplied into the passenger compartment through an air outlet (not shown).

The automotive air conditioner 1 configured as described above is controlled by a controller 30. The controller 30 computes a controlled variable of each actuator in order to attain a room temperature set by a driver or a passenger of the vehicle and then outputs a control signal to a drive circuit of each actuator. The controller 30 determines the controlled variables (open/close state) of each control valve, a drive amount of the compressor 2 and so forth, based on predetermined external information that has been detected by various sensors, and then supplies the control current with which to drive each actuator. Here, the predetermined external information includes temperatures inside and outside the passenger compartment and the air-blowout temperature of the evaporator, for instance. Through the control performed by the controller 30, the compressor 2 introduces the refrigerant, having a suction pressure Ps, via a suction chamber, and compresses this refrigerant so as to be discharged as the refrigerant having a discharge pressure Pd.

During a cooling operation, the control valve 4 is set in a valve-open state. At the same time, in the switching valve 8, the first valve section is set to a valve-open state while the second valve section is set to a valve-closed state. Thereby, the first refrigerant circulation passage is opened, and the second refrigerant circulation passage is shut off. Thus, the high-temperature and high-pressure gaseous refrigerant discharged from the compressor 2 is condensed by passing through the auxiliary condenser 3 and the external heat exchanger 5. At this time, the external heat exchanger 5 functions as an external condenser.

Then, the refrigerant having passed through the external heat exchanger 5 is throttled and expanded by the expansion valve 9 so as to become a misty, low-temperature and low-pressure refrigerant, and is led into the evaporator 6. Then this refrigerant evaporates in a process of passing through the evaporator 6 and thereby cools air inside the passenger compartment. The refrigerant led out from the evaporator 6 passes through the second internal passage of the expansion valve 9 and the refrigerant is returned to the compressor 2 by way of the accumulator 7. At this time, the expansion valve 9 is controlled such that the superheat of refrigerant at an outlet side of the evaporator 6 indicates an appropriate value.

During a heating operation, on the other hand, the control valve 4 is set to a valve-closed state. At the same time, in the switching valve 8, the first valve section is set to a valve-closed state while the second valve section is set to a valve-open state. Thereby, the first refrigerant circulation passage is shut off, and the second refrigerant circulation passage is opened. Thus, no refrigerant passes through the evaporator 6 and therefore the evaporator 6 practically does not function as such. In other words, the external heat exchanger 5 only functions as an evaporator (external evaporator). That is, the refrigerant discharged from the compressor 2 is condensed by passing through the auxiliary condenser 3, is throttled and expanded at the orifice 28 so as to become a misty, low-temperature and low-pressure refrigerant, and is led into the external heat exchanger 5. This refrigerant evaporates in a process of passing through the external heat exchanger 5 so as to absorb a quantity of heat from outside. The refrigerant led out from the external heat exchanger 5 passes through the bypass passage 25 and is returned to the compressor 2 by way of the accumulator 7.

Figure 2:
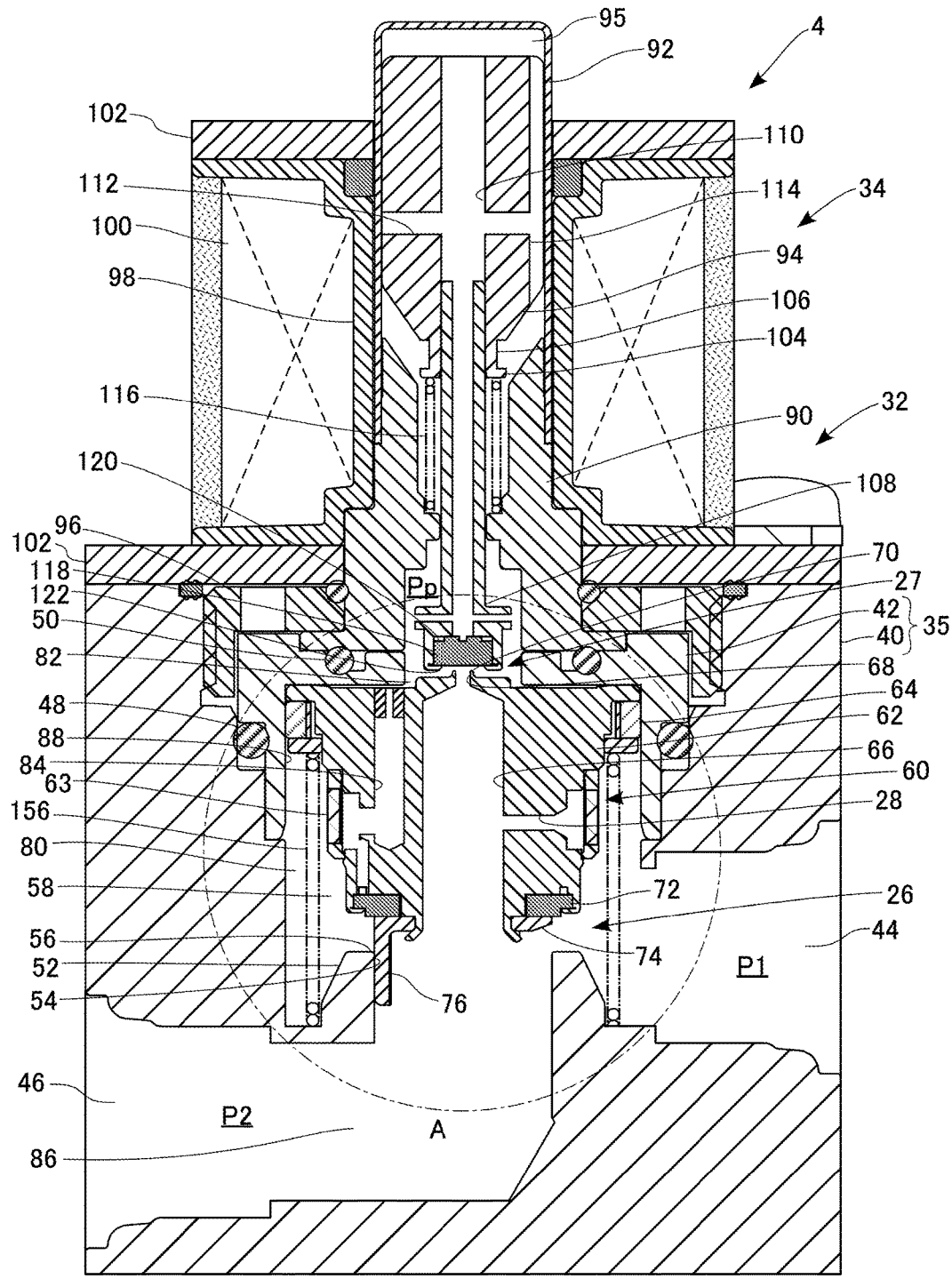
FIG. 2 is a cross-sectional view showing a concrete structure of a control valve.

A detailed description is now given of the control valve 4. FIG. 2 is a cross-sectional view showing a concrete structure of the control valve 4. The control valve 4 is configured by assembling a valve unit 32 and a solenoid 34 in a direction of axis line. The main valve 26 and the pilot valve 27 are built into a body 35 of the valve unit 32. Here, the main valve 26 opens and closes the main passage, and the pilot valve 27 controls the opening and closing of the main valve 26.

The body 35 is configured such that a second body 42 of stepped cylindrical shape is assembled to an upper half of a first body 40, which is a prismatic column in shape. In the present embodiment, the first body 40 is made of an aluminum alloy, and the second body 42 is made of stainless steel (SUS). A lead-in port 44 for leading in the refrigerant flowing from an upstream side is provided on one of side surfaces of the first body 40. A lead-out port 46 for leading the refrigerant out to a downstream side is provided on a side opposite to said one of side surfaces of the first body 40. A passage directly connecting the lead-in port 44 and the lead-out port 46 constitutes the "main passage".

An O-ring 48 is set between the first body 40 and the second body 42. Provision of the O-ring 48 prevents the refrigerant from being leaked through a gap in between the first body 40 and the second body 42. An upper end of the second body 42 functions as a connection area where the second body 42 and the solenoid 34 are connected. An O-ring 50 is fitted on the upper end of the second body 42.

A valve seat forming section 52 having a circular boss shape is provided in a communicating area, where the lead-in port 44 and the lead-out port 46 meet and communicate with each other, in the first body 40. The valve seat forming section 52 protrudes on a second body 42 side, and a valve hole 54 (corresponding to a "main valve hole") is formed in a space inward from the valve seat forming section 52. Also, a valve seat 56 (corresponding to a "main valve seat") is formed by an upper-end opening edge of the valve seat forming section 52. A valve chamber 58 is formed upstream of the valve hole 54.

A main valve element 60 is provided inside the body 35. The main valve element 60 has a body 62, of stepped cylindrical shape, whose diameter is enlarged in stages in an upward direction; a piston 64 is provided in an upper portion of the body 62. The body 62 is made of an aluminum alloy. A pilot passage 66 is so provided as to run through the body 62 in the direction of axis line. The pilot passage 66 functions as a "hole portion" that is open toward the valve hole 54. A pilot valve hole 68 is formed such that the inside diameter of an upper end of the pilot passage 66 is reduced, and a pilot valve seat 70 is formed on an upper-end opening of the pilot valve hole 68. A guide member 74 is provided in a lower part of the main valve element 60 such that a packing material 72 is held between the guide member 74 and the body 62. In the present embodiment, the guide member 74 is made of stainless steel (SUS). The packing material 72 is formed of a ring-shaped elastic body (rubber in the present embodiment) and functions as a "sealing member". The main valve element 60, which is displaceable within the valve chamber 58, closes and opens the main valve 26 when the packing material 72 touches and leaves the valve seat 56, respectively.

The guide member 74 has a disk-shaped body, which supports the packing material 72 from below, and a plurality of legs 76 (only one of these legs shown in FIG. 2), which extend downward from a peripheral edge part of this disk-shaped body. This guide member 74 is slidably supported by and along an inner circumferential surface of the valve hole 54.

The piston 64 functions as a "partition member" by which a space surrounded by the first body 40 and the second body 42 is partitioned into a high-pressure chamber 80 and a back pressure chamber 82. The high-pressure chamber 80 communicates with the lead-in port 44 and, at the same time, communicates with the back pressure chamber 82 by way of a communicating path 84 provided in the body 62. The back pressure chamber 82 communicates with the inside of the solenoid 34. A downstream side of the valve hole 54 forms a low-pressure chamber 86 and communicates with the lead-out port 46. A "sub-passage" is constituted by a passage that connects the lead-in port 44 to the lead-out port 46 by way of the high-pressure chamber 80, the communicating path 84, the back pressure chamber 82, the pilot passage 66 and the low-pressure chamber 86. The piston 64 is slidably supported by and along a guiding passage 88, which is formed in an inner circumferential surface of the second body 42. The main valve element 60 is configured such that the piston 64 and the legs 76 are slidably supported by and along the inner circumferential surface of the body 35; this configuration allows the main valve element 60 to operate in a stabilized manner in the opening and closing directions of the main valve 26.

Also, the orifice 28 is so formed as to run through the body 62 in a radial direction. The orifice 28, which is open to a lateral surface of the body 62, communicates between the lead-in port 44 and the pilot passage 66. The orifice 28 functions as an expander that throttles and expands the refrigerant led in from the lead-in port 44 and then leads it out to the pilot passage 66. A cylindrical filter member 63 is mounted on an outer circumferential surface of the body 62 such that the filter member 63 surrounds the openings of the orifice 28 and the communicating path 84 from the outside. The filter member 63 includes a filter (mesh) used to suppress foreign materials from entering the orifice 28 and the communicating path 84.

The solenoid 34 has a stepped cylindrical core 90 (fixed iron core), which is assembled to the second body 42 on an upper end thereof, and a bottomed cylindrical sleeve 92, which is so assembled as to close an upper-end opening of the core 90. The sleeve 92, which is nonmagnetic, together with the core 90 constitutes a can for closing an internal pressure chamber. A cylindrical plunger 94 (movable iron core) is contained inside the core 90. The plunger 94 is disposed within the sleeve 92 in a position opposite to the core 90 in the direction of axis line. A back pressure chamber 95 is formed between the bottom of the sleeve 92 and the plunger 94.

A ring-shaped fixed member 96 is fastened in an upper end opening of the first body 40. Thereby, the core 90 is secured relative to the second body 42. In other words, a flange portion, which protrudes radially outward, is provided at a lower end of the core 90, and the fixed member 96 is so assembled as to press down the flange portion from above. Also, the fixed member 96 has an external thread on an outer periphery thereof, and an internal thread is formed in an upper end opening of the first body 40. Thus, the core 90 can be stably secured when the fixed member 96 is screwed to the first body 40 while a lower end of the core 90 is being assembled to the upper end of the second body 42. The O-ring 50 is set between the core 90 and the second body 42, and prevents the refrigerant from being leaked through a gap in therebetween.

A bobbin 98 is provided on an outer periphery of the core 90, and an electromagnetic coil 100 is wound around the bobbin 98. A pair of end members 102 are so provided as to hold the electromagnetic coil 100 from top and bottom thereof. The end members 102 also function as a yoke that constitutes a magnetic circuit. A current carrying harness (not shown) is led out from the electromagnetic coil 100.

A tapered surface, where the inside diameter of the core 90 is larger upward, is formed at an upper end of the core 90. Also, a tapered surface where the outside diameter of the plunger 94 is smaller downward, is formed at a lower end of the plunger 94. A small-diameter part 104, which is inserted to and removed from the sleeve 92, is provided in a lower-end center part of the plunger 94. Specifically, the surface of the plunger 94 facing the core 90 and the surface of the core 90 facing the plunger 94 are the tapered surfaces each having a shape complementary to that of the other. Moreover, the arrangement is such that a part of the plunger 94 can be inserted to and removed from the core 90. Thus, a large stroke of the plunger 94 is secured and, at the same time, a sufficient magnetic attractive force is obtained. Also, a relatively large recessed groove 106 is formed on an outer circumferential surface of the small-diameter part 104, thereby inhibiting the magnetic leakage of the plunger 94 and the core 90 in a radial direction. By employing such configuration and arrangement as described above, the suction force produced by the solenoid 34 is obtained efficiently and stably.

A pilot valve element 108 extends downward from a lower-end center part of the plunger 94. Also formed are a communicating path 110, which runs through the plunger 94 in the direction of axis line, a communicating path 112, which runs through the plunger 94 in a radial direction, and a communicating groove 114 in parallel with the axis line along an outer circumferential surface of the plunger 94. The communicating paths 110 and 112 and the communicating groove 114 communicate with one another. By employing such structure and arrangement as described above, a state of communication between the back pressure chamber 82 and the back pressure chamber 95 is maintained. Set between the plunger 94 and the core 90 is a spring 116 (functioning as a "biasing member") that biases the plunger 94 in such a direction as to separate the plunger 94 away from the core 90.

The pilot valve element 108 is coaxially assembled to the plunger 94. A recessed fitting part 118 is formed at a lower end of the pilot valve element 108, and a disk-shaped sealing member 120 is fitted there. In the present embodiment, the sealing member 120 is made of rubber. The lower end of the fitting part 118 is swaged inward and thereby the sealing member 120 is immovably supported. The communicating path 110 communicates with the fitting part 118. The pilot valve 27 is closed and opened when the sealing member 120 of the pilot valve element 108 touches and leaves the pilot valve seat 70, respectively. A caulking part of the fitting part 118 constitutes a stopper 122, which is stopped by an upper end of the main valve element 60.

In the above-described structure and arrangement, an upstream-side pressure P1 introduced from the lead-in port 44 (hereinafter referred to as "upstream-side pressure P1") becomes a pressure P2 (hereinafter referred to as "downstream-side pressure P2") by passing through the main valve 26 in the main passage. Also, the upstream-side pressure P1 introduced into the high-pressure chamber 80 becomes an intermediate pressure Pp at the back pressure chamber 82 by passing through the communicating path 84, and further becomes the downstream-side pressure P2 by passing through the pilot valve 27.

Figure 3:
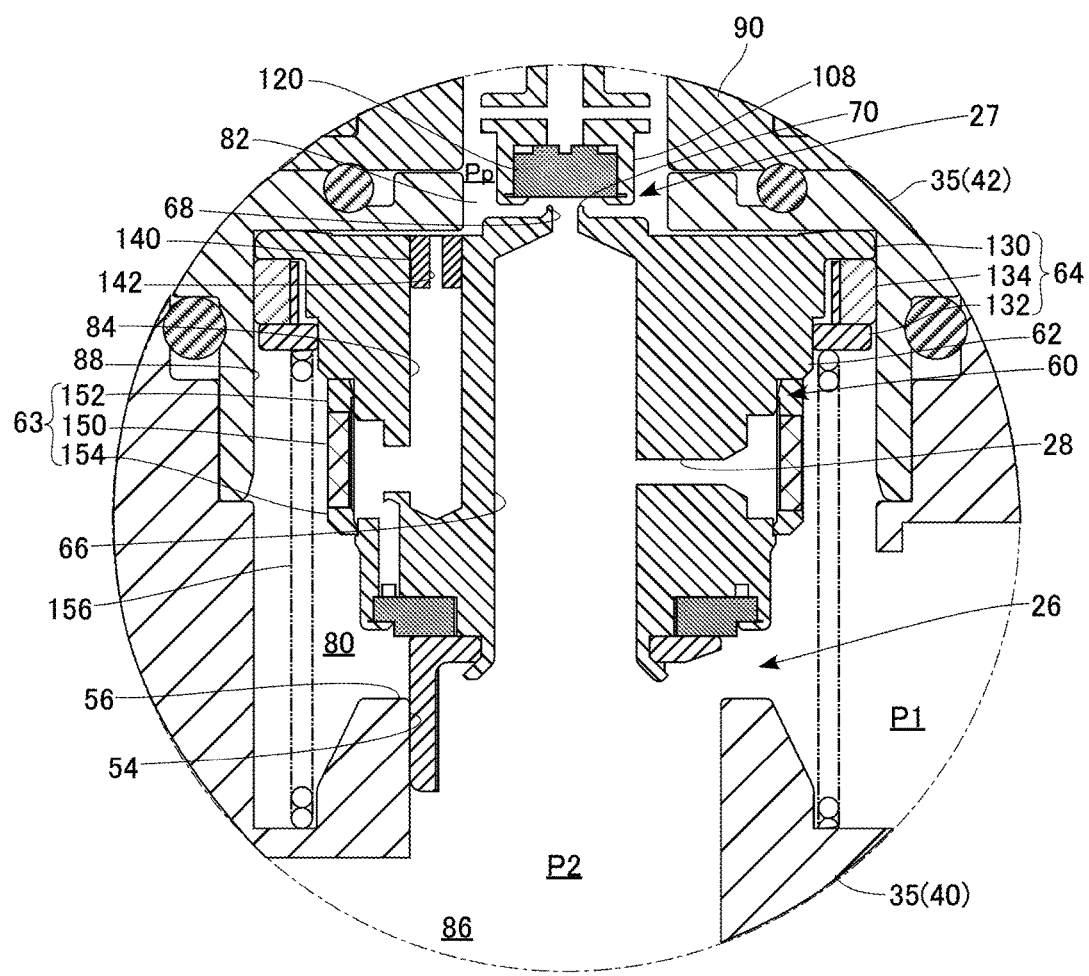
FIG. 3 is an enlarged view of a region encircled by A in FIG. 2.

FIG. 3 is an enlarged view of a region encircled by A in FIG. 2. The piston 64 is configured such that the piston 64 is divided, along the direction of axis line, into a piston body 130 and a support 132 and such that a piston ring 134 is held between the piston body 130 and the support 132. The piston body 130 is formed integrally with the body 62 of the main valve element 60. The piston ring 134 is formed of polytetrafluoroethylene (PTFE). A flange portion, which extends radially outward and abuts against a top face of the piston ring 134, is provided at an upper end of the piston body 130. The support 132, which is of annular shape, is fitted to a lower half of a small-diameter part of the piston body 130 in such a manner as to be inserted around the lower half thereof.

A spring 156, which biases the piston 64 in an upward direction, is set between the support 132 and the first body 40. The spring 156 functions as a "biasing member" that biases the support 132 in a direction in which the support 132 is brought close to the piston body 130. The piston body 130 and the support 132 each has an outside diameter slightly smaller than the inside diameter of the guiding passage 88. The piston ring 134 is assembled between the piston body 130 and the support 132 in a manner such that the piston ring 134 is fitted into a recess formed by the piston body 130 and the support 132. The piston 64 is slidably supported by and along the guiding passage 88 at the position of the piston ring 134.

The communicating path 84, which communicates between the high-pressure chamber 80 and the back pressure chamber 82, is formed in the body 62 of the main valve element 60. A path formation member 140, which is formed of a small cylinder, is press-fitted to an upper end of the communicating path 84, and an orifice 142 is formed by an internal path of the path formation member 140. A lower end of the communicating path 84 is open on a lateral side of the body 62 and communicates with the high-pressure chamber 80.

The orifice 28 extends radially at an intermediate position of the body 62 along the direction of axis line. A radially outward end of the orifice 28 is enlarged in diameter, thus the orifice 28 is formed in a tapered shape, and is open to the high-pressure chamber 80, whereas a radially inward end thereof is open to the pilot passage 66.

The diameter of the orifice 28 is sufficiently smaller than that of the pilot passage 66. Also, the diameter of the orifice 142 is sufficiently smaller than that of the pilot valve hole 68. The filter member 63 is provided on the main valve element 60 such that the filter member 63 surrounds each opening of the orifice 28 and the communicating path 84 from the outside. The filter member 63 includes a cylindrical filter 150, ring-shaped frames 152 and 154, which strengthen both upper and lower ends of the filter 150, respectively, and a plurality of column-like frames (omitted in FIG. 3) that connect these frames 152 and 154 in a vertical direction. The filter 150 is formed by a resin mesh, for instance, but may be a metallic mesh. These frames are integrally formed of resin materials and are held in such a manner that the filter 150 is partially embedded in each of these frames.

The filter member 63 is so fitted as to be inserted around the body 62. The filter member 63 prevents or suppresses the entry of foreign material into the orifice 28 and prevents the clogging of the orifice 28. This ensures that the orifice 28 can function as an expander. Also, the filter member 63 prevents or suppresses the entry of foreign material into not only the communicating path 84 but also the orifice 142 and prevents the clogging of the orifice 142. This ensures that the orifice 142 can function as a leakage passage.

Figure 4:
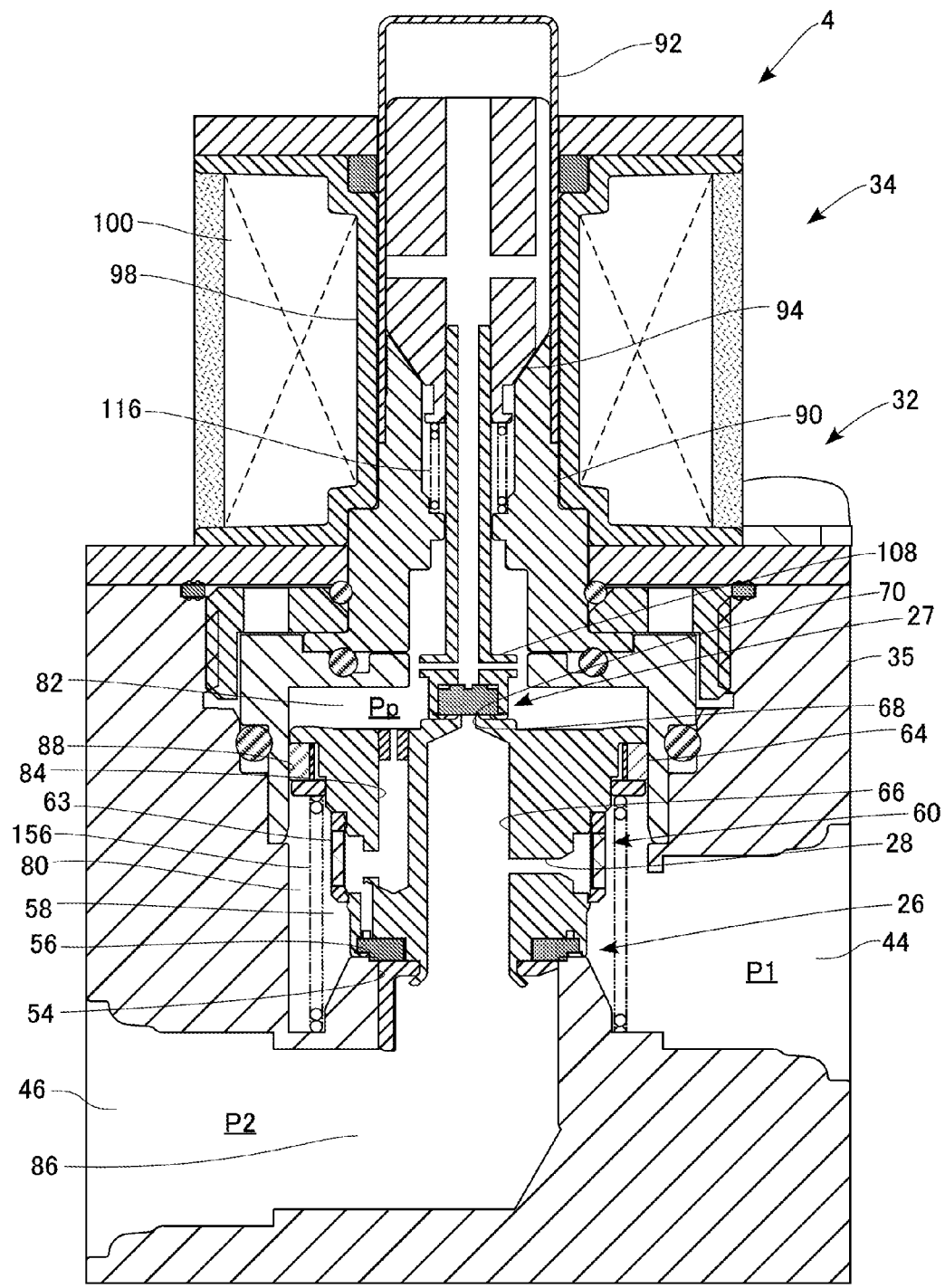
FIG. 4 is a diagram for explaining an operating state of a control valve.

The control valve 4 configured as described above functions as a pilot-operated control valve that switches the flow passages of refrigerant, depending on the conduction state of the solenoid 34. An operation of the control valve 4 is hereinbelow described in detail. FIG. 4 is a diagram for explaining an operating state of the control valve 4. FIG. 4 represents a conducting state where the solenoid 34 is turned on. Note that the already-explained FIG. 2 represents a nonconducting state where the solenoid 34 is turned off.

Since, as shown in FIG. 2, the force generated by solenoid does not work while the solenoid 34 is turned off, the plunger 94 is biased upward by the spring 116 and thereby the pilot valve 27 is open. At this time, the refrigerant at the back pressure chamber 82 is led out to a downstream side through the pilot passage 66 and thereby the intermediate pressure Pp drops. Hence, the main valve element 60 is biased upward by a pressure difference (P1−Pp) between the upstream-side pressure P1 and the intermediate pressure Pp. Thereby, the main valve 26 gets open. As a result, the main passage is opened as shown in FIG. 2. Specifically, the refrigerant introduced from the lead-in port 44 is led out from the lead-out port 46 mainly through the main passage.

When, on the other hand, the solenoid 34 is turned on as shown in FIG. 4, the suction force is created by the force, produced by the solenoid 34, in between the core 90 and the plunger 94. Thus, the plunger 94 is biased downward and then the pilot valve 27 is closed. Since, at this time, the refrigerant fed from the upstream side is led into the back pressure chamber 82 through the communicating path 84, the intermediate pressure Pp becomes the upstream-side pressure P1. As a result, the main valve element 60 is biased downward by a pressure difference (Pp−P2) between the intermediate pressure Pp and the downstream-side pressure P2. Thereby, the main valve 26 gets closed. That is, the main passage is closed as shown in FIG. 4. At this time, the liquid refrigerant introduced from the lead-in port 44 is throttled and expanded by passing through the orifice 28 so as to become a misty gas-liquid mixed refrigerant. Then, this refrigerant passes through the pilot passage 66 and the valve hole 54 so as to be led out from the lead-out port 46.

In the present embodiment as described above, the orifice 28 is formed in the main valve element 60, and the orifice 28 itself is so configured as to be movable. Also, the communicating path, which communicates between the lead-in port 44 and the lead-out port 46, is constantly formed by the pilot passage 66 and the orifice 28. While the control valve 4 is closed, the refrigerant introduced from the lead-in port 44 can therefore be throttled and expanded by passing through the orifice 28 so as to be led out from the lead-out port 46.

By employing the present embodiment, the orifice 28 is formed not in the body 35 but in the main valve element 60 and therefore the passages inside the body 35 and the arrangement of a valve mechanism are provided without constraints. Also, since the main valve element 60 is smaller than the body 35, the orifice 28 may be formed in a process different from the forming of the body 35. This can suppress the amount of processing required by the forming of the orifice 28. Also, the orifice 28 is easily obtained by making a small lateral hole toward the pilot passage 66 from a lateral surface of the main valve element 60. This makes the processing easy and can raise the manufacturing efficiency of the control valve 4.

The description of the present invention given above is based upon illustrative embodiments. These embodiments are intended to be illustrative only and it will be obvious to those skilled in the art that various modifications could be further developed within the technical idea underlying the present invention.

In the present embodiment, an exemplary embodiment is shown where the orifice 28 is extended in a radial direction of the main valve element 60, namely in a direction perpendicular to the extending direction of the pilot passage 66. In a modification, the orifice 28 may be so formed as to extend in an oblique direction relative to the axis line of the main valve element 60. In such a case, too, one-end opening of the orifice 28 is open to the high-pressure chamber 80 whereas the other-end opening thereof is open to the pilot passage 66.

In the present embodiment, an exemplary embodiment is shown where the control valve is configured as a normally-open electromagnetic valve that opens the pilot valve while the solenoid is turned off. In a modification, the control valve may be configured as a normally-closed electromagnetic valve that closes the pilot valve while the solenoid is turned off. In the configurations and arrangements shown in FIG. 2, FIG. 4 and so forth, for example, this modification can be achieved as follows. That is, the positions of the plunger and the core are vertically interchanged and then the pilot valve element is provided in a position of the plunger opposite to the core. In this case, the control valve functions as an expander while the power is off, and functions as a refrigerant passage that can ensure a sufficient flow rate of refrigerant when the power is on.

In the present embodiment, an exemplary embodiment is shown where the control valve is configured as a pilot-operated electromagnetic valve. In a modification, the control valve may be configured as a direct-driven electromagnetic valve having no pilot valve. In that case, too, the hole portion is formed in the valve element (main valve element) and thereby the orifice is so formed as to communicate with the hole portion. For example, the hole portion may be formed along the axis line of the valve element, so that the hole portion may be open to the valve hole only. One end of the orifice may be open to the high-pressure chamber (located upstream side of the valve hole) and the other end thereof may be open to the hole portion. Here, the hole portion has a cross-sectional area (diameter) sufficiently larger than that of the orifice.

In the above-described embodiments, a description has been given of an example where the control valve is applied to an air conditioner of an electric-powered vehicle but it goes without saying that the control valve according to the preferred embodiments is applicable to an air conditioner of a vehicle provided with an internal-combustion engine and an air conditioner of a hybrid vehicle equipped with both an internal-combustion engine and an electric motor drive.

The present invention is not limited to the above-described embodiments and modifications only, and those components may be further modified to arrive at various other embodiments without departing from the scope of the invention. Also, various other embodiments may be further formed by combining, as appropriate, a plurality of structural components disclosed in the above-described embodiments and modification. Also, one or some of all of the components exemplified in the above-described embodiments and modifications may be left unused or removed.

What is claimed is:

1. An electromagnetic valve configured as a pilot-operated control valve, comprising:
  a body having a lead-in port through which a refrigerant is led in, a lead-out port through which the refrigerant is led out, a main valve hole formed in a passage joining the lead-in port to the lead-out port, and a valve seat provided at an open end of the main valve hole;
  a main valve element that opens and closes a main valve by leaving and touching the valve seat, the main valve element having a piston separating a high-pressure chamber, communicating with the lead-in port, from a back pressure chamber, the main valve element having a pilot passage through which a low-pressure chamber communicating with the lead-out port and the back pressure chamber communicate with each other, the pilot passage extending through the main valve element;
  a solenoid mounted on the body; and
  a pilot valve element that opens and closes a pilot valve by moving toward and away from a pilot valve hole formed at one end of the pilot passage, the pilot valve element being provided integrally with a plunger of the solenoid,
  the-main valve element having:
    a stepped cylindrical shape;
    the pilot passage extending in a direction of axis line of the main valve element and being open to the main valve hole;
    a sealing member having a ring shape and being provided on the main valve element at a position radially outside of the pilot passage, the sealing member facing the valve seat in the direction of axis line, the sealing member opening and closing the main valve by leaving and touching the valve seat; and an orifice through which the lead-in port and the pilot passage communicate with each other, the orifice being open into the pilot passage through a lateral side of the main valve element in a radial direction that extends perpendicular to the direction of axis line of the main valve element and is disposed between the pilot valve and the main valve hole, and said orifice having a cross section smaller than that of the pilot passage, the orifice throttling and expanding the refrigerant led in from the lead-in port-and delivering the expanded refrigerant to the pilot passage.

2. The electromagnetic valve according to claim 1, further comprising a filter member mounted on an outer circumferential surface of the main valve element such that the filter member covers an opening of the orifice.

3. The electromagnetic valve according to claim 1, wherein the electromagnetic valve is configured as a control valve that is applied to an automotive air conditioner, the automotive air conditioner including: a compressor for compressing the refrigerant so as to be discharged; an external heat exchanger that functions as an external condenser radiating heat off the refrigerant during a cooling operation and that functions as an external evaporator evaporating the refrigerant during a heating operation; and an internal evaporator that evaporates the refrigerant, wherein the lead-in port communicates with a passage connected to a discharge side of the compressor, and wherein the lead-out port communicates with a passage connected to an inlet of the external heat exchanger.

4. The electromagnetic valve according to claim 2, wherein the electromagnetic valve is configured as a control valve that is applied to an automotive air conditioner, the automotive air conditioner including: a compressor for compressing the refrigerant so as to be discharged; an external heat exchanger that functions as an external condenser radiating heat off the refrigerant during a cooling operation and that functions as an external evaporator evaporating the refrigerant during a heating operation; and an internal evaporator that evaporates the refrigerant, wherein the lead-in port communicates with a passage connected to a discharge side of the compressor, and wherein the lead-out port communicates with a passage connected to an inlet of the external heat exchanger.

* * * * *